J. W. Hollingsworth,
Cage Trap,
No 58,826. Patented Oct. 16, 1866.
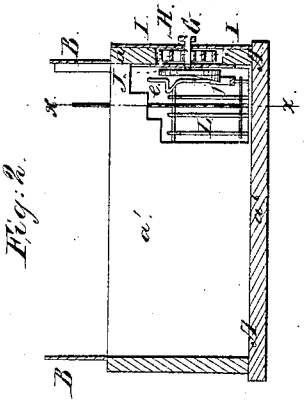
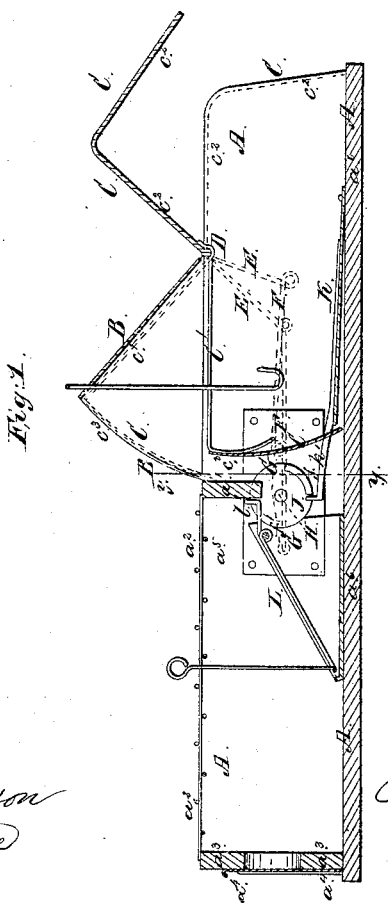
Witnesses:
F. A. Jackson
J. A. Service
Inventor:
John W. Hollingsworth
Per Munn & Co.
Attorneys

UNITED STATES PATENT OFFICE.

JOHN W. HOLLINGSWORTH, OF SEYMOUR, INDIANA.

IMPROVEMENT IN ANIMAL-TRAPS.

Specification forming part of Letters Patent No. 58,826, dated October 16, 1866.

*To all whom it may concern:*

Be it known that I, JOHN W. HOLLINGSWORTH, of Seymour, in the county of Jackson and State of Indiana, have invented a new and useful Improvement in Animal-Traps; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved trap, taken through the line $x\ x$, Fig. 2, showing the position of the parts when the trap is set, and also, in red lines, the position of the parts when the trap is sprung. Fig. 2 is a vertical cross-section of the same, taken through the line $y\ y$, Fig. 1.

Similar letters of reference indicate like parts.

My invention has for its object to furnish an improved trap, simple in construction, efficient in operation, and not liable to get out of order; and it consists of a trap formed by the combination of the rocking lid, stationary cap, lifting gate, treadle, cam-wheel, spring, cranks, and connecting-rod with each other and with the box of the trap, as hereinafter more fully described.

A is the box of the trap, which is divided into two parts by the partition $a^1$. The top of the rear part of the box A is formed of a wire net-work, $a^2$, which allows the light to pass freely into said part. Through the rear end, $a^3$, of the trap is formed a hole, closed by a sliding gate, $a^4$, through which the animals may be removed from the trap when desired.

B is a stationary cap attached to the upper edges of the rear part of the forward compartment of the box A, the rear edge of which cap projects upward, as shown in Fig. 1.

C is the rocking lid, the front and rear parts of which are rigidly connected by arms $e^1$, one of which is shown in Fig. 1. The front part, $e^2$, of the rocking lid, when closed or lowered, covers the part of the trap in front of the stationary cap B and forms the forward end of the trap, as shown in red in Fig. 1; and the rear part, $e^3$, when closed or raised, closes the space between the rear edge of the stationary cap B and the partition $a^1$, as shown in red lines in Fig. 1, converting the forward compartment of the box A into a close and dark box.

When the trap is set, the forward part, $e^2$, of the rocking lid C is raised, and the rear part, $e^3$, lowered, closing the opening through the partition $a$, so that the animals can enter the trap in either direction and see the way of escape open before them.

The rocking lid C is securely and rigidly attached to the shaft D, which works in bearings in the upper side edges of the box A, as shown in Fig. 1. One end of the shaft D is bent over, so as to form a crank, E, to the end of which is pivoted the end of the connecting-rod F, the other end of which is pivoted to the end of the crank G, formed upon the projecting end of the short shaft H.

I is a spring, placed in a cavity formed in the side $a^5$ of the box A for its reception, and which is attached to the shaft H.

J is a small wheel, securely attached to the inner end of the shaft H. Upon the inner side of this wheel is formed a cam-shaped projection, $j$, which, when the trap is set, catches upon a hook formed upon the end of the arm $k'$ of the treadle K, as shown in Figs. 1 and 2, and, when the trap has sprung, catches upon the hook $l'$ formed by the upper end of the lifting gate L.

The forward edge of the treadle K is attached to the bottom $a^6$ of the box A, and it is made in such a shape as to give a slight tendency to its rear edge to rise, thus forcing the hook upon the end of the arm $k$ up into a position to catch upon the cam-wheel J. Or, if desired, a spring may be placed beneath the treadle K for this purpose.

L is a lifting gate, pivoted at its upper end to the side walls of the passage-way leading from the front to the rear compartment of the box A. The front edge of the floor of this passage-way is slightly turned up, as shown, so that the imprisoned animals may be unable to get hold of the lower edge of said gate to raise it.

To the end of the crank G is attached a handle, by means of which the spring I may be wound up when necessary.

I claim as new and desire to secure by Letters Patent—

An improved animal-trap, formed by the combination of the rocking lid C, the stationary cap B, the lifting gate L, the treadle K, cam-wheel J, spring I, cranks G and E, and connecting-rod F with each other and with the box A, substantially as herein described and for the purposes set forth.

JOHN W. HOLLINGSWORTH.

Witnesses:
 PETER PLATTER,
 JOHN L. HAGINS.